G. A. BOYDEN, Jr., AND J. C. BOYDEN.
RAILWAY CAR TRUCK.
APPLICATION FILED FEB. 21, 1920.

1,341,778.

Patented June 1, 1920.
2 SHEETS—SHEET 1.

Inventors
George A. Boyden Jr.
and John C. Boyden
By John W. Mosley
Attorney

G. A. BOYDEN, Jr., AND J. C. BOYDEN.
RAILWAY CAR TRUCK.
APPLICATION FILED FEB. 21, 1920.

1,341,778.

Patented June 1, 1920.
2 SHEETS—SHEET 2.

Inventors
George A. Boyden Jr.
and John C. Boyden
By John W. Alverley, Attorney

UNITED STATES PATENT OFFICE.

GEORGE A. BOYDEN, JR., AND JOHN C. BOYDEN, OF BALTIMORE, MARYLAND.

RAILWAY-CAR TRUCK.

1,341,778.  Specification of Letters Patent.  Patented June 1, 1920.

Application filed February 21, 1920. Serial No. 360,481.

*To all whom it may concern:*

Be it known that we, GEORGE A. BOYDEN, Jr., and JOHN C. BOYDEN, citizens of the United States, residing at Baltimore, in the State of Maryland, have invented certain new and useful Improvements in Railway-Car Trucks; and we do hereby declare the following to be a full, clear, and exact description of the invention, such as will enable others skilled in the art to which it appertains to make and use the same.

Our invention relates to railway car trucks.

Our application for U. S. Letters Patent for railway car trucks which was filed May 22, 1919, and serially numbered 298,953 involves a truck comprising members that act coördinately horizontally so that the wheels and journals will conform to the contour of the rails whatever it may be.

The truck shown in said application also involves vertical actions of the members which differ from equalized vertical actions but the underlying methods and the means for effectuating the vertical actions of the truck shown in said application were not particularly explained or illustrated and described and no claims were made for said methods nor for the mechanical combinations by which said actions were effectuated.

Our application for U. S. Letters Patent for railway car trucks which was filed August 5, 1919 and serially numbered 315,427 involves a truck comprising members that act coördinately horizontally so that the wheels and journals will conform to the contour of the rails whatever it may be; and furthermore, the last-named application is intended to cover generically the underlying methods and the mechanical combinations of trucks comprising members that act coördinately horizontally as in the truck shown in the first-named application and which, in addition, have equalized vertical actions, wherein the vertical actions of the truck members shown in the last-named application differ from the vertical actions of the truck members shown in the first-named application.

The present application is intended to cover generically the underlying methods and the mechanical combinations involved in trucks having vertical actions of the members which are the same as the vertical actions of the members shown in the first-named application.

The vertical actions of the members shown in this application differ from equalized vertical actions and will hereinafter be referred to as disparate vertical actions.

Among the objects of our invention are:—

To prevent any wheel of the truck from being forced into a depressed place in a rail, or into an opening between rails, by a force approximating the weight it supports when it is running upon a rail having a normal surface.

To prevent a wheel from pressing upon a rail having a subnormal supporting capacity, owing to lack of support by the sleepers or for any other cause, with the same force it would press upon said rail if the supporting capacity at that point were normal.

The methods by which we effectuate our improved results consist in transmitting the load applied to the king pin by the car body through a rigid member or members comprising a vertically rigid structure, to a plurality of springs each having a short range of action and through these springs distributing the load to the wheels in such a manner that should any wheel drop slightly below the position it would occupy if it were running upon a rail having a normal surface and normal supporting capacity, the vertical stress due to the load supported by said wheel will be minimized or reduced to zero.

Thus, when all the wheels of our improved truck are upon portions of the rails which are of normal surface and normal supporting capacity, the load applied to the king pin will be equally distributed to said wheels, but should one or more wheels pass over a depression in a rail, a break between rails, or encounter a portion of rail of subnormal supporting capacity, then the vertical pressure due to the load upon said wheel will be instantly reduced or entirely relieved, resulting in a great reduction in shock upon said portions of the rails or upon the abutting ends of said rails and the remainder of the load, or the whole load, will be equally distributed to the wheels that are upon portions of rails having normal surfaces and normal supporting capacities.

Thus, it is evident that there is an equalized vertical action of the wheels when they are running upon normal portions of the rails, but that when any wheel moves over a portion of a rail having an abnormal surface or a subnormal supporting capacity, as hereinbefore explained, then the vertical action upon said wheel is instantly differentiated from the vertical action upon the other wheels and hence the vertical actions upon said wheels are disparate with reference to each other.

Among the results of the operations of the methods and structures herein adverted to, there is a great reduction in the force of shocks between the rails and wheels which reduces their surface wear and also reduces crystallization of the rails, wheels and axles and thus greatly prolongs their lives, and conduces to easy riding. There is also a great reduction in resistance to the pull of the draw-bar of the locomotive, because the reduction in vertical stress upon a wheel over a portion of a rail, having an abnormal surface or a subnormal supporting capacity, will act to reduce the horizontal effort required to move said wheel from said portion.

One set of combinations of elements by which may be effectuated our improved methods for producing disparate vertical actions of the wheels upon the rails will now be described and the methods and combinations will be pointed out in the claims, but it is to be understood that our improved methods may be effectuated by many combinations of elements other than those described and claimed; also, that many changes may be made in said combinations without departing from the spirit of so much of our invention as is embodied therein. It is also to be understood that while we have shown our invention as applied in a six wheel truck, it is not to be understood as being limited in its application to trucks having six wheels.

One embodiment of means for effectuating our improved methods is shown in the accompanying drawings, in which.

In the drawings like numerals refer to like parts throughout the several views.

Figure 1:
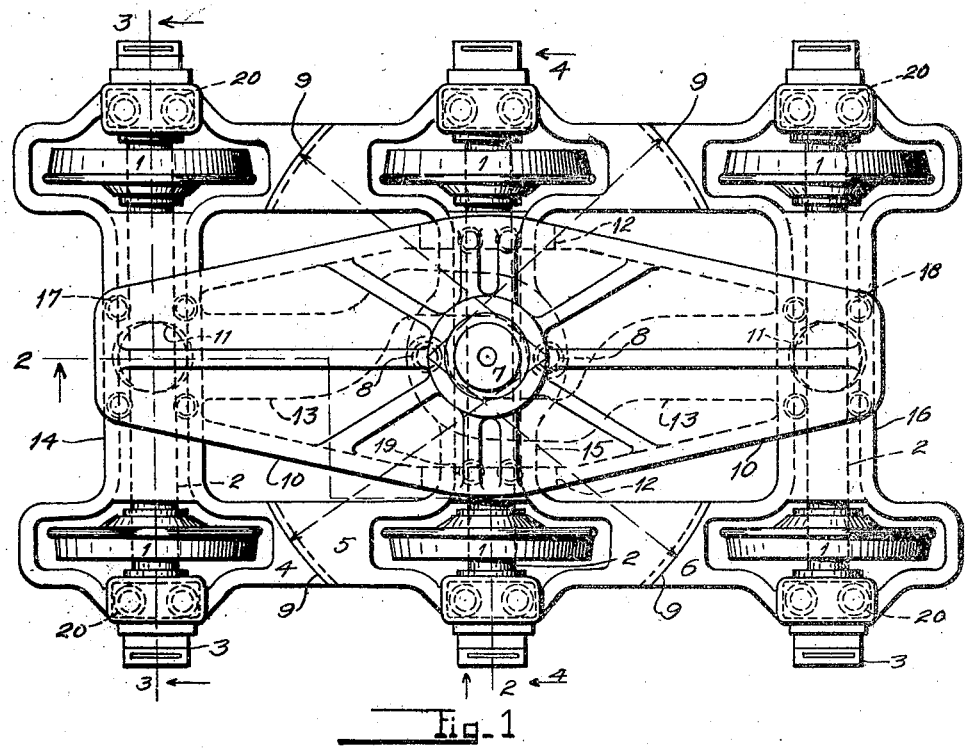
Figure 1 is a plan view of a truck constructed and arranged to operate according to our improved methods.
Figure 2:
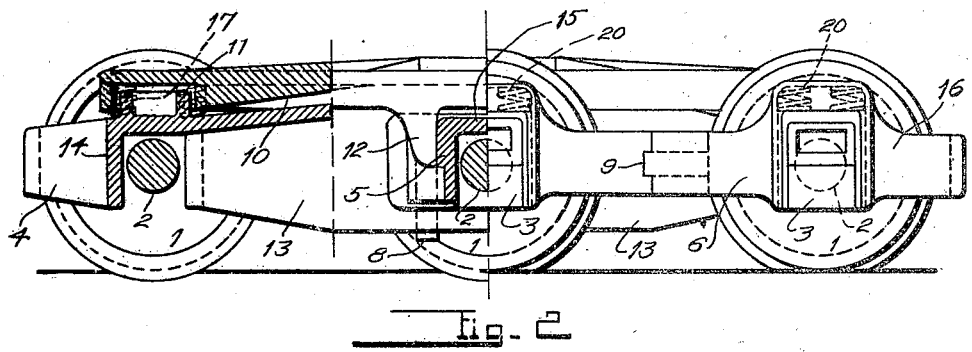
Fig. 2 is a side view of the truck shown in Fig. 1, said view being shown partly in section and the section being taken as along the line 2—2 in Fig. 1 looking in the direction of the arrows.
Figure 3:
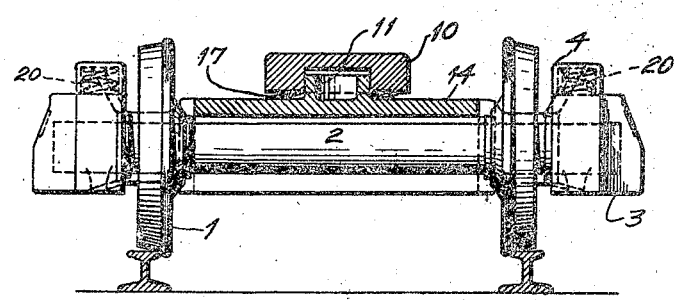
Fig. 3 is a section along the line 3—3 in Fig. 1 looking in the direction of the arrows.
Figure 4:
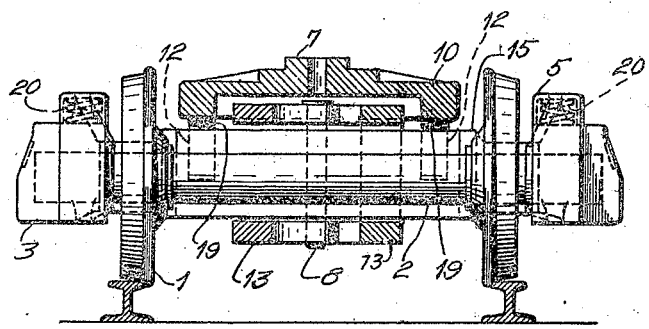
Fig. 4 is a central section through the king pin 7 viewed in the direction of the arrows 4—4 in Fig. 1.

The wheels 1, axles 2 and journal boxes 3 are all Master Car Builders standards and said boxes slide vertically in the usual manner within pedestals provided on the journal members 4, 5 and 6.

The pedestals at the ends of each of the members 4, 5 and 6 are joined together, respectively, by frames 14, 15 and 16, preferably formed integrally with said pedestals.

The middle frame 15 has two pins 8—8 rigidly supported therein and the end frames 14 and 16 are each provided with an arm 13, preferably formed integrally therewith. The end of each arm 13 is bifurcated, one prong extending over the middle frame 15 and the other prong extending thereunder. Both prongs are provided with holes for the reception of one of the pins 8 and each pair of prongs is mounted on the pin 8 which is remote from the end frame of which the prongs form parts. Thus, each end member is pivotally connected to the middle member upon the pin 8 which is remote from the corresponding end member.

In order to give additional vertical rigidity to the journal members thus pivoted together, the end members are joined to the middle member by tongue and groove bearings 9 and the axes of curvature of the bearing surfaces of said bearings are the axes of the pins 8—8. In Fig. 1 the radii of curvature of the outer surfaces of said bearings upon the middle member are indicated by the dotted lines.

By this construction, the end members 4 and 6 are permitted to move freely horizontally about the axes of the pins 8—8, but at the same time, the end members are locked vertically with the middle member 5 by bearings 9 so that the three members together constitute a structure that is flexible in a horizontal direction but rigid in vertical directions.

The coördinating member 10 is articulated to the end members 4 and 6 by trunnions 11 which extend up into suitable elongated counter-bearings in the coördinating member. In said bearings the trunnions have bearings upon the sides thereof, while the middle journal member 5 is held in position by pedestals 12 of the coördinating member 10 by which the action of the middle journal member is governed and held or retained in its proper position relative to the contour of the track, whether straight or curved, as set forth in our application for U. S. Letters Patent Serial No. 298,953, hereinbefore referred to.

The king pin 7 is formed upon the coördinating plate 10 and said king pin may be of any approved form.

The construction and operation of the parts hereinbefore referred to are fully set forth and explained in our application for U. S. Letters Patent Serial No. 298,953, hereinbefore referred to.

Extension springs such as 17 and 18 are introduced between the ends of the coördinating member 10 and the end frames 14 and 16, and extension springs such as 19 are introduced between the coördinating member 10 and the middle frame 15, the purpose of these springs being to distribute the load applied to the king pin 7 to the rigid structure composed of the members 4, 5 and 6.

In order to provide for disparate vertical actions of the wheels, as hereinbefore adverted to, we introduce extension springs such as 20 between the top of each of the journal boxes 3 and the inside of each pedestal, said springs being secured in said pedestals in any approved manner and each spring is made of a predetermined range of action so that in case a journal box 3 moves downwardly, with reference to the corresponding pedestal, a predetermined extent, it will be relieved from the pressure of said springs.

It is evident that if said journal boxes move downwardly to a less extent than to the position at which they are relieved from the pressure of the springs 20, then said boxes will be subjected to a corresponding pressure from said springs and, consequently, by suitable construction of said springs, their pressure upon the tops of said boxes may be caused to vary in any predetermined ratio with the movement of said boxes.

The disparate vertical actions of our improved truck occur as follows:—

The vertical load stress applied to the king pin 7 is distributed through the coördinating member 10 and the springs 17, 18 and 19 to the vertically rigid structure composed of the members 4, 5 and 6 and through said vertically rigid structure the vertical load stress is distributed to the upper ends of the springs 20 and through said springs, to the tops of the journal boxes 3.

When all the wheels are upon portions of rails having normal surfaces and normal supporting capacities, the vertical load stress applied to the king pin 7 will be equally distributed to the six wheels, but should any wheel pass over a portion of track having a depression therein, or should said wheel pass over a break between the ends of adjacent rails, then said wheel will drop with reference to the corresponding pedestal, and the pressure of the corresponding spring 20 upon the top of said box will be reduced, or if said wheel should drop far enough, said pressure will be entirely relieved. The same effect takes place when any wheel passes over a portion of a rail of subnormal supporting capacity, because as said rail tends to become depressed under the influence of the vertical load stress, the pressure of the spring 20 upon the journal box 3 corresponding to said wheel will be reduced or relieved.

When any wheel drops as just explained, then the vertical load stress applied to the king pin 7 is equally distributed to the remaining wheels and, consequently, there are always equalized vertical actions of the wheels that are running upon rails having normal surfaces and normal supporting capacities, but the vertical action of the wheel that is upon a portion of a rail having an abnormal surface or a subnormal supporting capacity is disparate from said equalized vertical actions of the rest of the wheels.

It is believed that the methods and combinations herein set forth are new and generic in scope and all equivalents thereof are, therefore, to be considered as included in the claims hereof.

We claim:—

1. The herein described method of relieving the vertical spring stresses upon the wheels of a truck, consisting in relieving the spring stress from the wheel subject to abnormal rail surface or depression and transmitting it to the remaining wheels of the truck.

2. The herein described method of rendering disparate the vertical spring stresses upon the wheels of a truck, which consists in imposing the load stress upon a rigid structure, transmitting the total vertical load stress through said structure to springs having short ranges of action, and transmitting through said springs to each wheel that is upon a portion of rail having a normal surface and normal supporting capacity, a proportion of the total vertical load stress imposed upon said rigid structure approximately equal to said load stress divided by the number of wheels that are upon such portions and reducing the vertical spring stress upon the wheel that is upon a portion of the rails that has an abnormal surface.

3. The herein described method of rendering disparate the vertical load stresses upon the wheels of a truck, which consists in imposing the load upon a rigid structure, transmitting the total vertical load stress through said structure to springs having short ranges of action, and transmitting through said resilient structures to each wheel that is upon a portion of rail having a normal surface and normal supporting capacity, a proportion of the total vertical load stress imposed upon said rigid structure approximately equal to said load stress divided by the number of wheels that are upon such portions and reducing the vertical spring stress upon the wheel that is upon a portion of the rails that has a subnormal supporting capacity.

4. In a truck, the combination with a rigid structure subjected to the vertical load stress, and comprising pedestals, wheels, axles comprising journals and boxes for said journals vertically movable in said pedestals, of a resilient structure having a short range of action mounted between each of said boxes and said rigid structure, and clearance in said pedestal below said boxes whereby said boxes can drop below the range of action of said springs.

5. In a railway truck, the combination with a load distributing member, a rigid load carrying member, wheels for supporting said load and springs between said wheels and carrying member, of means acting to relieve the spring stress from wheels subject to predetermined abnormal rail conditions, and to transmit a portion of the load equal to said stress to wheels subject to normal rail conditions.

In testimony whereof we affix our signatures.

GEORGE A. BOYDEN, Jr.
JOHN C. BOYDEN.